United States Patent
Dahlmeier et al.

(10) Patent No.: US 9,336,776 B2
(45) Date of Patent: May 10, 2016

(54) ENHANCING SPEECH RECOGNITION WITH DOMAIN-SPECIFIC KNOWLEDGE TO DETECT TOPIC-RELATED CONTENT

(71) Applicants: Daniel Dahlmeier, Singapore (SG); Gerd Moser, Stetten a.k.M. (DE); Basem Suleiman, North Sydney (AU); Marcus Roy, Cremorne (AU); Dominik Schrank, North Sydney (AU)

(72) Inventors: Daniel Dahlmeier, Singapore (SG); Gerd Moser, Stetten a.k.M. (DE); Basem Suleiman, North Sydney (AU); Marcus Roy, Cremorne (AU); Dominik Schrank, North Sydney (AU)

(73) Assignee: SAP SE, Walldorf (DE)

( * ) Notice: Subject to any disclaimer, the term of this patent is extended or adjusted under 35 U.S.C. 154(b) by 282 days.

(21) Appl. No.: 13/874,854

(22) Filed: May 1, 2013

(65) Prior Publication Data

US 2014/0330558 A1   Nov. 6, 2014

(51) Int. Cl.
   *G10L 15/183*   (2013.01)
   *G10L 15/18*    (2013.01)

(52) U.S. Cl.
   CPC ........... *G10L 15/183* (2013.01); *G10L 15/1815* (2013.01)

(58) Field of Classification Search
   CPC ........ G10L 15/22; G10L 115/183; G10L 5/22
   USPC ........................................... 704/275
   See application file for complete search history.

(56) References Cited

U.S. PATENT DOCUMENTS

| | | | |
|---|---|---|---|
| 6,173,266 B1 | 1/2001 | Marx et al. | |
| 6,601,027 B1 * | 7/2003 | Wright et al. | 704/235 |
| 6,839,669 B1 * | 1/2005 | Gould et al. | 704/246 |
| 7,113,088 B2 | 9/2006 | Frick et al. | |
| 7,340,395 B2 | 3/2008 | Gurram et al. | |
| 7,360,164 B2 | 4/2008 | Bjoernsen et al. | |
| 7,398,211 B2 * | 7/2008 | Wang | 704/257 |
| 7,634,407 B2 * | 12/2009 | Chelba et al. | 704/251 |
| 7,966,566 B2 | 6/2011 | Ritter et al. | |
| 8,112,275 B2 * | 2/2012 | Kennewick et al. | 704/240 |
| 8,130,937 B1 | 3/2012 | Thenthiruperai et al. | |
| 8,209,181 B2 | 6/2012 | Heckerman et al. | |
| 8,249,876 B1 * | 8/2012 | Ainslie | 704/270 |
| 8,731,935 B2 | 5/2014 | Chavez et al. | |
| 2004/0006464 A1 | 1/2004 | Geppert et al. | |
| 2008/0300865 A1 * | 12/2008 | Balchandran | G10L 15/1822 704/9 |
| 2009/0204399 A1 | 8/2009 | Akamine | |
| 2009/0232032 A1 | 9/2009 | Kelley | |
| 2010/0204994 A1 * | 8/2010 | Kennewick et al. | 704/257 |
| 2012/0179465 A1 | 7/2012 | Cox et al. | |
| 2012/0203845 A1 | 8/2012 | Lakshmanan et al. | |
| 2013/0226576 A1 | 8/2013 | Jaiswal et al. | |

\* cited by examiner

*Primary Examiner* — Douglas Godbold
(74) *Attorney, Agent, or Firm* — Fish & Richardson P.C.

(57) ABSTRACT

Methods, systems, and computer-readable storage media for providing action items from audio within an enterprise context. In some implementations, actions include determining a context of audio that is to be processed, providing training data to a speech recognition component, the training data being provided based on the context, receiving text from the speech recognition component, processing the text to identify one or more action items by identifying one or more concepts within the text and matching the one or more concepts to respective transitions in an automaton, and providing the one or more action items for display to one or more users.

17 Claims, 6 Drawing Sheets

ENHANCING SPEECH RECOGNITION WITH DOMAIN-SPECIFIC KNOWLEDGE TO DETECT TOPIC-RELATED CONTENT

BACKGROUND

Enterprises implement various technologies to enable collaboration. For example, employees of organizational departments (e.g. sales and marketing) often participate in a number inter-organization and intra-organization meetings. In many instances, technologies (e.g., audio conferencing, video conferencing, telepresence, and the like) are used to facility such meeting, increasing the efficiency and effectiveness of the meeting experience. However, capturing and tracking meeting content (e.g., meeting minutes, action items, participants, subsequent meeting requests) are generally manual activities. For example, it can be common practice to record and download meeting audio and/or video for further processing or future reference.

In many instances, processing the meeting content largely remains an intricate, manual and reoccurring task, affecting one or more meeting participants. Furthermore, processing meeting content can be time-consuming that can require adjusting to different styles and concepts (often used by participants) to organize and manage meeting minutes. Consequently, additional human effort can be required to capture, track, manage and distribute meeting content.

SUMMARY

Implementations of the present disclosure include computer-implemented methods for providing action items from audio within an enterprise context. In some implementations, actions include determining a context of audio that is to be processed, providing training data to a speech recognition component, the training data being provided based on the context, receiving text from the speech recognition component, processing the text to identify one or more action items by identifying one or more concepts within the text and matching the one or more concepts to respective transitions in an automaton, and providing the one or more action items for display to one or more users.

In some implementations, the automaton includes a plurality states and one or more transitions, a transition representing a transition between states.

In some implementations, processing the text further includes, for action items of the one or more action items, determining a respective quality score.

In some implementations, the quality score is determined based on a precision score and a relevance score.

In some implementations, the precision score is determined based on an accumulated probability of matched transitions of the automaton and a sum of all probabilities of transitions along accepting paths of the automaton.

In some implementations, the relevance score is determined based on a degree of matching of a path of the action item with respective paths of one or more previously selected action items.

In some implementations, the one or more actions items are displayed based on respective quality scores.

In some implementations, the training data includes domain-specific information provided from a knowledge base.

In some implementations, the domain-specific information includes topic-related information and domain-specific terminology.

In some implementations, the context is determined based on user input.

In some implementations, the user input includes user speech provided in the audio.

In some implementations, actions further include receiving user input, the user input indicating selection of an action item of the one or more action items, and providing the action item to a management component.

In some implementations, the management component monitors execution of the action item.

In some implementations, the audio is provided as real-time audio.

In some implementations, the audio is provided as recorded audio.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to automatically identifying and managing action items from audio. In some examples, the audio includes captured during a meeting within an enterprise context. More particularly, implementations of the present disclosure are directed to enhancing speech recognition using domain-specific knowledge to improve the precision of audio recognition without requiring a substantial amount of training data. Implementations further provide a combined ranking algorithm based on the semantic description of action items to improve the precision of real-time detection of action items from audio. In some implementations, an extendable language of potential action items is provided and can be used to identify and rank potential action items from a continuous stream of text recognized from meeting utterances. In some implementations, ranking of action items is enhanced based on user-relevance feedback taken from previous user decisions on the correctness of detected action items.

More generally, implementations of the present disclosure can be used to continuously capture an audio stream of an on-going or recorded meeting, and provide a real-time user interface (e.g., a web-based interface) that displays a ranked list of action items to one or more meeting participants. In some examples, meeting participants can review and verify action items, while the systems tacitly learns from this feedback and incorporates the feedback into future action item rankings.

Existing speech recognition routines can lack recognition precision and generally produces context-free, non-actionable text. To achieve the objective of reliably capturing specific topical descriptions, such as action items, implementations of the present disclosure provide increased speech recognition accuracy, and topic-related text. In some examples, the topic-related text is provided using auto-complete and is ranked for display to users.

In accordance with implementations of the present disclosure, a knowledge base (KB) is provided to enhance the learning process of the language model used by a speech recognizer. In some examples, the KB is populated with topic-related information, e.g., employee names, and domain-specific terminology, e.g. system names and abbreviations, defined around a specific topic such as action items. Further, and based on the recognized (and potentially incomplete) text, the KB and a topical ranking algorithm (TOP-Rank) are used to match, rank and auto-complete potential text snippets representing, possibly partial action items. In some examples, and as discussed in further detail herein, TOP-Rank includes a precision component and a relevance measure component.

Figure 1:
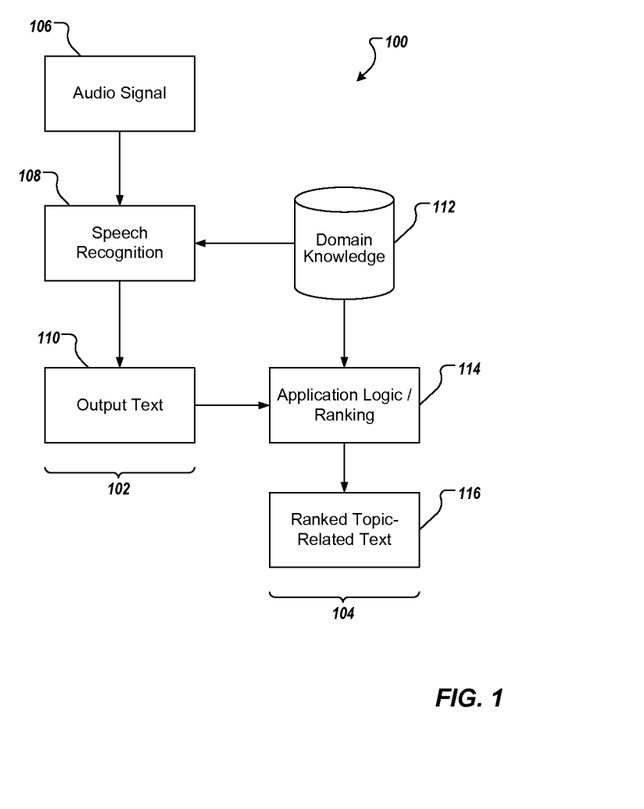
FIG. 1 depict an example high-level architecture in accordance with implementations of the present disclosure.

FIG. 1 depicts an example high-level architecture 100 in accordance with implementations of the present disclosure. The example architecture 100 includes a speech recognition side 102 and an enhancement side 104. In the depicted example, the speech recognition side 102 includes an audio signal 106, a speech recognition component 108 and output text 110. In some examples, the audio 106 is provided to the speech recognition component 108 as real-time audio or recorded audio. In some examples, the speech recognition component 108 is provided as one or more computer-executable programs executed using one or more computing devices. In some examples, the speech recognition component 108 processes the audio 106 to generate the output text 110. In some examples, the output text 110 is provided as a computer-readable document (e.g., a file).

In the depicted example, the enhancement side 104 includes a KB 112, an application logic/ranking component 114, and ranked topic-related text 116. In some examples, the KB 112 provides topic-related information and domain-specific terminology to the speech recognition component 108. In this manner, the speech recognition component 108 can use the topic-related information and domain-specific terminology to enhance the accuracy of speech recognition in view of the context of the audio 106. For example, the audio 106 can be associated with a particular context (e.g., a managers meeting between managers of different departments within an enterprise). In some examples, the topic-related information and domain-specific terminology that is to be provided to the speech recognition component 108 is determined based on the context of the audio 106. The application logic/ranking component 114 processes the output text 110 to identify and rank text related to action items, for example, and provide the ranked topic-related text 116.

Figure 2:
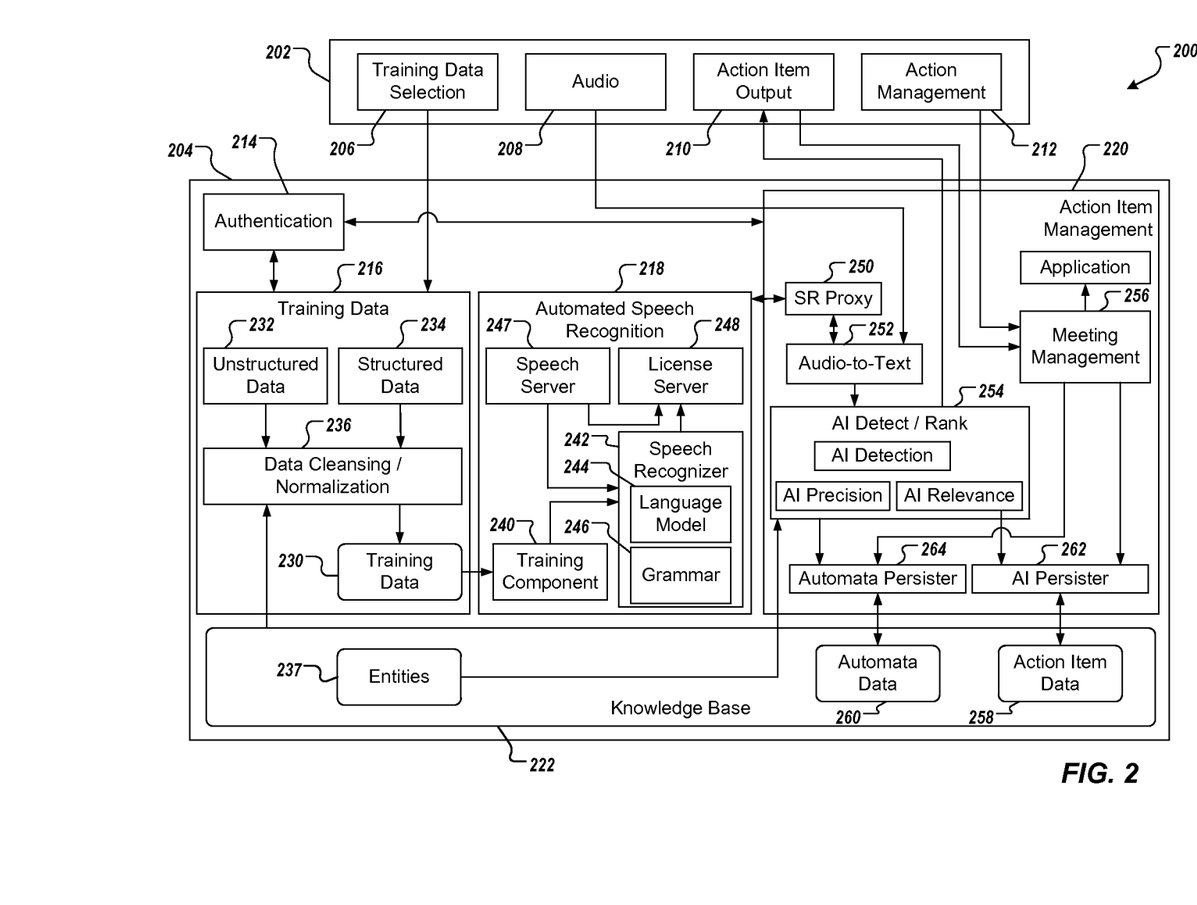
FIG. 2 depicts an example system that can be used to execute implementations of the present disclosure.

FIG. 2 depicts an example system 200 that can be used to execute implementations of the present disclosure. The example system 200 includes a client-side 202 and a server-side 204. In some examples, the client-side 202 represents one or more client-side computing devices (e.g., laptop computers, desktop computers, smartphones, tablet computing devices), and the server-side 202 represents one or more server-side computing devices (e.g., servers). In some examples, the client-side 202 and the server-side communicate over a network (not shown). In some examples, components and/or sub-components of the client-side 202 and/or of the server-side 204 can be provided as one or more computer-executable programs executed using one or more computing devices. In some examples, components and/or sub-components of the client-side 202 and/or of the server-side 204 can be provided in and/or provided as computer-readable media (e.g., memory).

In the example of FIG. 2, the client-side 202 includes a training data selection component 206, an audio component 208, an action item output component 210, and an action management component 212. The server-side 204 includes an authentication component 214, a training data component 216, an automated speech recognition (ASR) component 218, an action item management (AIM) component 220, and a KB 222.

In accordance with implementations of the present disclosure, and as discussed in further detail herein, the client-side 202 can provide audio (e.g., in real-time, or recorded) to the server-side 202, which processes the audio to generate one or more action items, to rank action items in a plurality of action items, to provide action items for display to the client-side 202, and to manage action items. More particularly, the training data component 216 provides enhanced training data to the ASR component 218. In some examples, the enhanced training data is provided in view of a context. In some examples, the training data selection component 206 can be used to determine the context. For example, user input can be provided to the training data selection component 206, the user input indicating selection of a context. An example context can identify subject matter of the audio (e.g., discussion regarding a sales department, a marketing department, and/or an engineering department of an enterprise). In some examples, the user input can include audio that can be processed to determine the context.

In some implementations, the KB 222 stores context-related data that can be used as training data by the ASR component 218. In some examples, context-related data that is specific to the indicated context of the audio is provided to the ASR component 218. In some implementations, the ASR component 218 receives audio from the AIM component 220 and provides transcripts from the audio based on a language model and a grammar, as discussed in further detail herein. The ASR component 218 provides the transcripts back to the AIM component 220. As discussed in further detail herein, the AIM component 220 post-processes text to detect and rank action items from the text.

In further detail, the KB is repository for storing context-related data from different domains. Example data can include business terms and associated knowledge, address book, action verbs, and/or system, software and process information. In some examples, the data can be manually, automatically, or semi-automatically extracted from appropriate data sources and populated in a relational database of the KB 222. In some examples, data within the KB 222 is used to enhance the accuracy of recognizing enterprise-based audio. Example enterprise-based audio includes real-time and/or recorded audio from an in-person meeting, a teleconference and/or a video conference. In general, data from the KB 222 can be used to recognize key concepts discussed in meetings. An example concept can include a person that is responsible for an action item, action verbs and/or software and systems that can be used to perform tasks of the action item. As discussed in further detail herein, concepts can be input to an action item detection and ranking (AIDR) component discussed in further detail herein. In some examples, the KB 222 stores relationships between concepts that form action items, the user-relevance feedback, and textual descriptions of action items that have been recognized and enriched, as discussed in further detail herein.

In some implementations, the training data component 216 generates structured training data 230 that is used by the ASR component 218. More particularly, the training data component 216 obtains structured and semi-structured data 232, 234 from respective data sources, as well as the KB 222. In some examples, the training data component 216 includes a data cleansing/normalization sub-component 236 that processes the data to provide the training data in a particular format (e.g., extensible mark-up language (XML)). In some examples, data includes meeting minute transcripts, and meeting-related data from the KB 222, and other data relevant to statistical machine translation, for example (e.g., news data from the Workshop for Machine Translation (WMT)). The training data is provided to the ASR component 218.

In some implementations, the KB 222 stores one or more entities 237 that can be used to enhance speech recognition and detect action items. Example entities can include terms (e.g., domain-specific terminology) and associated knowledge, address books (e.g., employee information), action verbs, and/or system, software and process information.

In some implementations, the ASR component 218 includes a training component 240 and a speech recognizer component 242. The speech recognizer component includes a language model 244 and a grammar 246. In general, the ASR component 218 receives the training data 230 and used the training data to generate text (transcripts) from speech (e.g., audio files) based on the language model 244 and the grammar 246. In some examples, the grammar 246 is provided as a user-defined grammar from the training component 240. In some implementations, the ASR component 218 is provided from a third-party (e.g., based on a speech server and a license server 248). It is appreciated, however, that implementations of the present disclosure are ASR-agnostic and independent of any third-party that provides the ASR component 218. Regardless of the source of the ASR component 218, implementations of the present disclosure provide enhancement of the speech recognition capabilities based on the user-defined (context-based) training data 230 provided from the training data component 216.

In some implementations, the AIM component 220 provides audio to the ASR component 218 and receives text from the ASR component 218 through a speech recognition (SR) proxy 250. In general, the AIM component 220 processes the text recognized by the ASR component 218 to detect, rank and provide action items for display at the client-side 202. In the example of FIG. 2, the AIM component 220 includes an audio-to-text (A2T) component, an action item detection and ranking (AIDR) component 254, and a meeting management component 256. In some examples, the A2T component 252 receives audio from the client-side 202, and provides the audio to the ASR component 218 through the SR proxy 250. As discussed above, the audio is translated into text at the ASR component 218 and is provided back to the A2T component 252 through the SR proxy 250 (e.g., in an XML file).

In some implementations, ASR-independent protocols can be used for communication between the A2T component 254 and the ASR component 218. Example protocols can include a session initiation protocol (SIP) (a signaling protocol that is widely used for controlling communication sessions such as voice and video calls over Internet Protocol (IP)), a real-time transport protocol (RTP) (a standardized packet format for delivering audio and video over IP networks), and a media resource control protocol (MRCP) (a communication protocol used by speech servers to provide various services such as speech recognition and speech synthesis to clients. In some examples, MRCP relies on another protocol, such as real-time streaming protocol (RTSP) or SIP for establishing a control session and audio streams between the client and the server.

In general, the AIDR component 254 detects action items from text received from the A2T component 252, and ranks each action item based on precision and relevance. More particularly, the AIDR component 254 reads the text and uses data from the KB 222 to detect relevant concepts. The detected concepts can be automatically filled as recognized states and transitions based on the logic of the AIDR component 254 in view of a selected automaton, discussed in further detail below. In some examples, the logic underlying the AIDR component 254 creates a language of action items (using automata) and matches the language with the text. In some examples, the ranked results can include one or more action items that can be displayed to one or more users on the client-side 202 (e.g., by the action item output component 210) for verification and selection. For example, a user can decide which action item is the most precise and correct, and can select the action item. In some examples, the selected action items are passed back to the meeting management component 220, which updates action item data 258 and/or automata data 260 of the KB 220 through respective persisters 262, 264.

In some implementations, the meeting management component 256 maintains recognized and selected action items and related information (e.g., tracking and updating status of the action item, scheduling future meetings, and informing users on the progress of action items). In some examples, the meeting management component facilitates searching and discovery of information from action items associated with other meetings. In some examples, the meeting management component 256 can provide access to action item data to enrich the language model 244, which in turn improves speech recognition accuracy.

With particular reference to action item detection and ranking (e.g., performed by the AIDR component 254), a language of topics is defined. In some examples, and as used herein, topics can include action items. In some examples, the language of action items is used as a foundation to identify possible action items and to describe measures of precision and relevance of an identified action item. In accordance with implementations of the present disclosure, non-finite automata (NFA) with empty-word transitions (NFA-$\epsilon$) are used to represent an action item language. In some examples, the NFA-$\epsilon$ includes a plurality of states ($q_1, q_2, \ldots, q_n$) and transitions between states. In some examples, each transition is associated with a concept in the KB 220. In some examples, the NFA-ϵ receives a sequence of concepts as input. In some examples, the sequence of concepts is taken from the text provided by the ASR component 218. In some implementations, each automaton is context-specific and/or domain-specific (e.g., manually or automatically).

Figure 3:
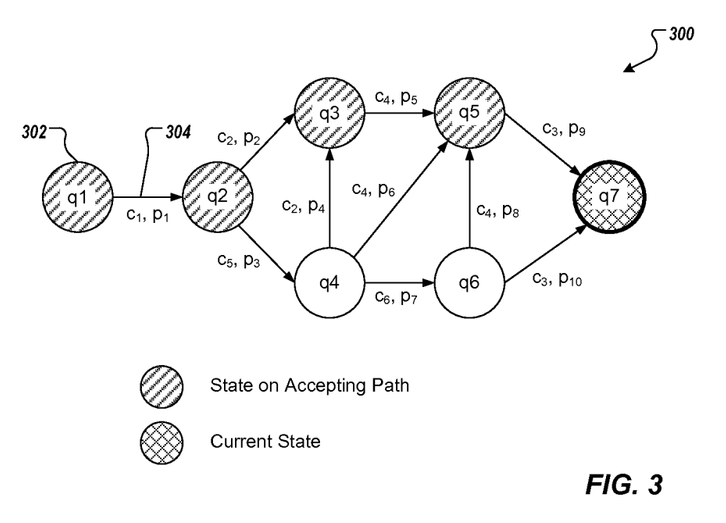
FIG. 3 depicts an example automaton.

FIG. 3 depicts an example automaton 300. The example automaton 300 includes nodes 302 and edges 304 between nodes. Each node 302 represents a state and each edge 304 represents a transition between states. In the depicted example, the automaton 300 include states $q1, \ldots, q7$, where the state $q1$ is an initial state, the states $q2, \ldots, q6$ are intermediate states, and the state $q7$ is a final state. In some examples, each edge (transition) is associated with a respective concept. In the depicted example, the automaton 300 includes concepts $c_1, \ldots, c_6$, and different edges can be associated with the same concept (e.g., concepts $c_2, c_3, c_4$ are associated with multiple edges). In some examples, each edge (transition) is associated with a respective probability. In the depicted example, the automaton 300 includes probabilities $p_1, \ldots, p_{10}$. In some examples, and as discussed in further detail herein, recognition of a concept from text can result in transitions between states. In some examples, a transition path from the initial state to the final state can be provided based on the recognized concepts.

For purposes of illustration, an example transition path provided from example text will be discussed. It is appreciated, however, that implementations of the present disclosure are applicable to other transition paths and texts. With continued reference to FIG. 3, example concepts can be provided as:

$c_1$: Person
$c_2$: Action Verb
$c_3$: Date
$c_4$: Task
$c_5$: Priority
$c_6$: System An example text (e.g., recognized from audio by the ASR component 218 can be provided as:

John creates an inventory list by tomorrow.

The example text can be matched to a sequence of concepts. In this example, the word "John" can be matched to $c_1$, the word "creates" can be matched to $c_2$, the words "inventory list" can be matched to $c_4$, and the word "tomorrow" can be matched to $c_3$. This example sequence of concepts triggers respective state transitions leading to the final state $q7$ as depicted in FIG. 3. Consequently, the example text (phrase) can be identified as a potential action item.

In some examples, an action item can be provided as a tuple of concepts. Continuing with the example above, an example action item can be provided as:

action_item=$(c_1, c_2, c_3, c_4, c_5, c_6)$

In some example, an action item can be provided as a complete tuple (e.g., each concept in the tuple includes a value). In some examples, an action item can be provided as a partial tuple (e.g., less than all concepts in the tuple include a value). In the example above, the word "John" was matched to $c_1$, the word "creates" was matched to $c_2$, the words "inventory list" was matched to $c_4$, and the word "tomorrow" was matched to $c_3$. Consequently, an example action item can be provided as:

action_item=(John, creates, tomorrow, inventory list,)

As discussed above, the ASR component 218 captures a continuous stream of audio and transcribes the audio into a continuous stream of text. In some examples, this can be achieved based on streaming audio, or capturing and splitting the audio and processing separate audio files. Implementations of the present disclosure, address detection of action items as quantifiable units (e.g., when does an action item start and when does the action item end in the text, particularly across multiple audio files).

Figure 4:
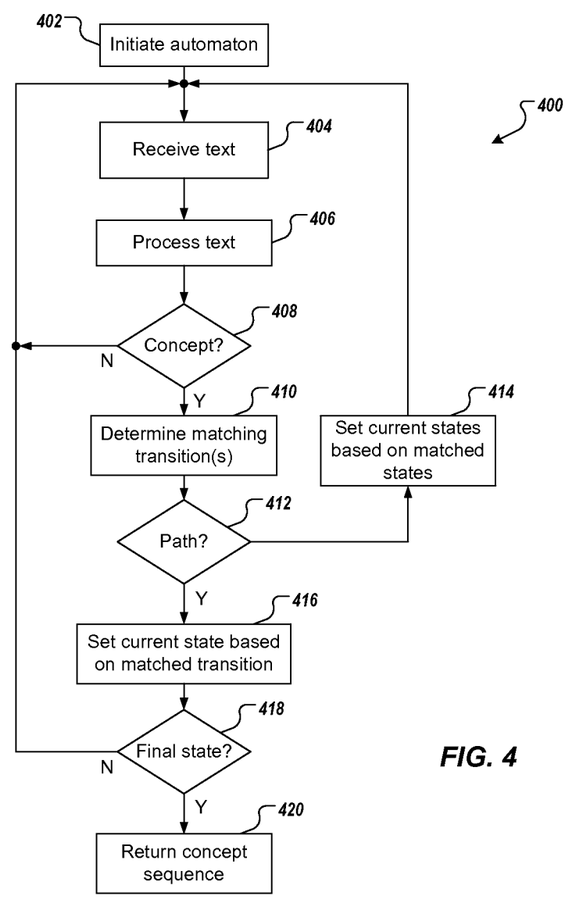
FIG. 4 depicts an example processes that can be executed in accordance with implementations of the present disclosure.

FIG. 4 depicts an example process 400 that can be executed in accordance with implementations of the present disclosure. More particularly, the example process 400 can be executed to identify complete and/or partial action items. In some examples, the example process 400 can be provided as one or more computer-executable programs executed using one or more computing devices.

An automaton is initiated (402). For example, an automaton is retrieved (e.g., from the KB 222 of FIG. 2) and is set to the initial state. Text is received (404). For example, text is received by the AIDR component 254 from the ASR component 218. The text is processed (406). For example, the AIDR component 254 processes the text in view of a plurality of concepts. The plurality of concepts can be retrieved from the KB 222. It is determined whether one or more concepts are identified in the text (408). If no concepts are identified, the example process 400 loops back. If one or more concepts are identified, each concept is matched to a respective transition of the automaton (410). It is determined whether the transitions are on an accepting path of the automaton (412). In some examples, for each matched transition, a position of the transition is checked against an action item context condition (AICC). In some examples, the AICC returns true, if a matched transition is part of an accepting path starting from a current state, and returns false, if a matched transition is not part of an accepting path starting from the current state or is part of an accepting path but precedes the current state.

For example, and with reference to FIG. 3, if the current state is state $q1$ and the identified concept is concept $c_1$, the AICC returns true. As another example, if the current state is $q2$ and the identified concepts include $c_1, c_5$ and $c_6$, the AICC returns true. As another example, if the current state is state $q6$ and the identified concepts include concepts $c_1$ and $c_2$, the AICC returns false. As another example, if the current state is state $q3$ and the identified concepts include concepts $c_4$ and $c_3$, the AICC returns true.

If it is determined that the transitions are not on an accepting path of the automaton (the AICC returns false), current states are set based on matched states and the example process 400 loops back. If it is determined that the transitions are on an accepting path of the automaton (the AICC returns true), the current state is set based on matched transitions (416), and it is determined whether the current state (newly set) is the final state of the automaton (418). If the current state is not the final state, the example process 400 loops back. If the current state is the final state, the concept sequence is returned (420).

In general, implementations of the action item detection process (e.g., the example process 400 of FIG. 4) can complete if one or more concepts form a sequence of concepts leading to an accepting state, or a concept has been detected, which indicates the start of a new action item (interrupting the detection of the current action item). In some examples, after a complete (e.g., final state is reached) or partial (e.g., intermediate state is reached) action item has been detected, the current states are updated and the detection continues. In some examples, reaching the final state represents the ideal case, in which the ASR component 218 is accurate and the automaton is completely defined. The latter case (interrupting detection of the current action item before reaching the final state), however, represents a realistic case, in which it can occur that the ASR component 218 skips or wrongly detects terms, leading to missing or incorrect concepts. In some cases, the automaton itself can be incomplete. In both cases, partial action items can be detected by skipping concepts and transitions (empty-word transitions) as well as to constantly re-evaluate the context of a current action item (e.g., using the example process 400 of FIG. 4).

As discussed above, implementations of the present disclosure provide for measuring quality of detected action items. In some implementations, a precision score ($\omega_p$) and a relevance score ($\omega_r$) are determined for each action item. In some examples, a quality score is determined for each action item based on the precision score and the relevance score. In some examples, the quality score is provided as a weighted average of the precision score and the relevance score.

In some implementations, the precision score generally describes how accurately a detected action item is represented in the automaton. In some examples, the precision score is determined based on the number of concepts matched to transitions in the automaton. In some examples, the precision score indicates the degree of matching. In some examples, the correct order of concepts is considered in that only action items, in which the concepts appear in a specific sequence, are detected. This is realized by using the AICC condition, discussed above, which returns false, and therefore breaks the current action item context, if a matched concept precedes any current state.

In some implementations, the precision score is defined as the ratio of the sum of the probability for matched transitions to the sum of the accumulated probability of all accepting paths containing matched transitions. The numerator hereby describes the quality of an action item by returning a high value if many concepts have been found. In contrast, the denominator describes the ambiguity. Accordingly, the less accepting paths that are included, the less ambiguity is inherent to the current detected action item, the higher the relevance score.

In some implementations, precision scores for action items (partial or complete) are determined based on the accumulated probability of matched transitions divided by the sum of all probabilities of transitions along accepting paths.

With reference to the example automaton 300 of FIG. 3, an example partial action item can include the state q1 being the current state and the state q2 being the matched state, which succeeds the current state and is located on an accepting path. The intermediate (partial) precision score for this example partial action item can be provided as:

$$\omega_p = \frac{p_1}{p_{ALL}}$$

where:

$$p_{ALL} = (p_1 + p_3 + p_7 + p_{10}) + \ldots + (p_1 + p_2 + p_5 + p_9)$$

In this example, all the matched state is part of all accepting paths of the automaton 300.

As another example, an example partial action item can include the state q2 being the current state and the state q6 being the matched state. In this example, the matched state is not a direct successor to the current state, but the AICC still returns true, because the matched state is part of one or more accepting paths. In this example, there are two matched transitions from the current state to the matched state (e.g., the transition from q2 to q4, and the transition from q4 to q6). In this example, the number of all accepting paths containing the matched transition reduces to $p_1 \to p_3 \to p_7 \to p_{10}$ and $p_1 \to p_3 \to p_7 \to p_8 \to p_9$. Accordingly, the intermediate precision score for this example partial action item can be provided as:

$$\omega_p = \frac{p_1 + p_7}{(p_1 + p_3 + p_7 + p_{10}) + (p_1 + p_3 + p_7 + p_8 + p_9)}$$

As another example, an example partial action item can include the state q6 being the current state and the state q3 being the matched state. In this example, the matched state is not on an accepting path starting from the current state, so the AICC returns false. In this example, detection of the current action item ceases, and an intermediate precision score is returned. Accordingly, the intermediate precision score for this example partial action item can be provided as:

$$\omega_p = \frac{p_2}{(p_1 + p_3 + p_4 + p_5 + p_9) + (p_1 + p_2 + p_5 + p_9)}$$

In some examples, a new partial action item can be started with q2 as the current state. As another example, the new partial action item can include the state q2 as the current state and the state q7 as the matched state. In this example, the matched state succeeds the current state and is part of an accepting path. Consequently, the AICC returns true. Accordingly, the intermediate precision score for this example partial action item can be provided as:

$$\omega_p = \frac{p_2 + p_9}{(p_1 + p_2 + p_5 + p_9)}$$

With regard to the relevance score, the relevance score can be determined based on a degree of matching with any previously selected path, where correct sequences of concepts are ranked higher, and the relevance of detected action items are ranked higher, when the corresponding selected paths have been selected more frequently. Accordingly, the relevance score can be based on user feedback stored in the KB, where feedback includes action items selected by users, which indicates that the path of the selected action item was a correct path (sequence).

In further detail, a set of concepts stored in the KB can be provided as:

$$c \in C$$

and a set of selected paths can be provided as:

$$p \in P_{selected}$$

In some examples, each selected path can be understood as a sequence of concepts as follows:

$$sq: P_{selected} \to 2^C, sq(p) = C_s \text{ for } C_s \subseteq C$$

Subsequences of the selected paths can be provided as:

$$P_{sub} \in \mathcal{P}(sq(p))$$

In some examples, the number of times the type of action item has been selected (i.e., the corresponding accepted path) is multiplied. In some examples, for any selected path, this number of times (number of occurrences) can be denoted as $n_p$. In some examples, a logarithmic function can be applied to mitigate high numbers of selections and large sequences of concepts. In some examples, the length of the path subsequences can be raised to the power of a, which is a parameter that can be chosen (e.g., a=2). Relevance scores can be calculated based on the following example relationship:

$$\omega_r = \log(|n_p|) * \log\left(\sum_{P_{sub} \in \mathcal{P}(sq(p))} |P_{sub}|^a\right)$$

Calculation of the relevance score will be further discussed by way of example with reference to FIG. 3. In one example, a partial action item can be provided as states q2, q3 and q5, including concepts $c_2$ and $c_4$. A first selected action item (stored in the KB) can include a complete action item provided as states q1, q2, q4, q5, q7 including concepts $c_1$, $c_5$, $c_4$, $c_3$, and can include an action item that was selected 20 times ($n_{p,1}$=20). A second selected action item (stored in the KB) can include a complete action item provided as states q1, q2, q3, q5, q7 including concepts $c_1$, $c_2$, $c_4$, $c_3$, and can include an action item that was selected 5 times ($n_{p,2}$=5). Continuing with this example, the corresponding relevance score for the first selected action item in view of the matched action item can be provided as:

$$\omega_{r,1} = \log(20)*\log(2)$$

and the corresponding relevance score for the second selected action item in view of the matched action item can be provided as:

$$\omega_{r,2} = \log(5)*\log(8)$$

As discussed above, a quality score ($\omega_{score}$) is determined for each detected action item (partial or complete) based on the precision score and the relevance score. In some examples, the quality score is provided as a weighted average of the precision score and the relevance score. In some examples, the respective weighting parameters $\alpha_1$, $\alpha_2$ are provided, where $\alpha_1, \alpha_2 \in [0,1]$. The quality score can be determined based on the following example relationship:

$$\omega_{score} = \frac{(\alpha_1 * \omega_p + \alpha_2 * \omega_r)}{2}$$

As discussed herein, one or more action items can be detected from the text, and each action item can be associated with a respective quality score. In some examples, the action items are displayed to a user (or multiple users) (e.g., using the action item output component 210 of FIG. 2). In some examples, the action items are displayed in rank order based on the quality scores. In some examples, action items having higher quality scores are displayed more prominently than action items having lower quality scores. In some examples, an action item can be selected by a user. In some examples, the user selection is provided as feedback (e.g., stored in the KB) for evaluating subsequently detected action items. For example, a count indicating the number of times the particular action item has been selected (e.g., $n_p$, discussed above) can be incremented.

Figure 5:
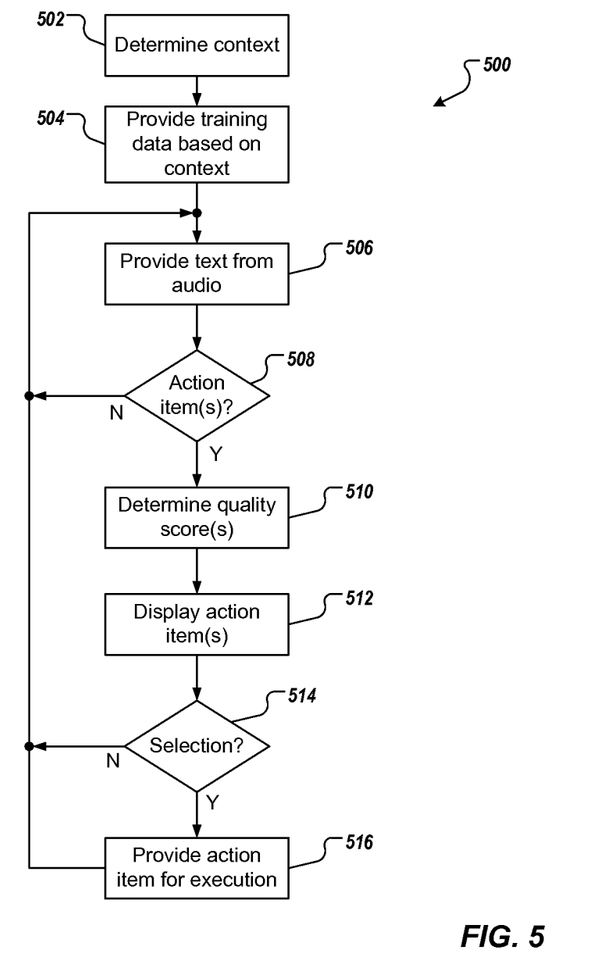
FIG. 5 depicts an example processes that can be executed in accordance with implementations of the present disclosure.

FIG. 5 depicts an example process 500 that can be executed in accordance with implementations of the present disclosure. In some examples, the example process 500 can be provided as one or more computer-executable programs executed using one or more computing devices.

A context is determined (502). In some examples, the context is provided as a context of audio (real-time or recorded) that is to be provided. In some examples, the context can indicate subject matter captured in the audio (e.g., a departmental meeting between employees of an enterprise). In some examples, the context is determined based on user input indicating user-selection of a context. In some examples, the user input can include audio that can be processed to determine the context. Training data is provided based on the context (504). In some examples, training data is provided based on topic-related information and/or domain-specific terminology provided from a KB. In some examples, and as discussed in detail herein, a language model is trained based on the training data. Text is provided from audio (506). In some examples, and as discussed herein, the audio is processed based on the language model to provide the text.

It is determined whether one or more action items are detected from the text (508). For example, and as discussed in detail herein, action items can be determined based on matching concepts detected in the text with concepts of an automaton to transition between states. In some examples, action items can include partial action items and/or complete action items. In some examples, a partial action item includes an action item that is detected, but does not include a final state within the automaton. In some examples, a complete action item includes an action item that is detected and that does include a final state within the automaton. If it is determined that no action items have been detected, the example process loops back.

If it is determined that one or more action items have been detected, respective quality scores are determined (510). In some examples, each quality score is determined based on a precision score and a relevance score. Action items are displayed (512). In some examples, and as discussed herein, action items are displayed to one or more users in rank order based on the respective quality scores. It is determined whether an action item has been selected from the displayed action items (514). If an action item has not been selected, the example process 500 loops back. If an action item has been selected, the action item is provided for execution (516) and the example process loops back. In some examples, the selected action item can be provided to an action item management component that provides feedback to the system and that enables execution and monitoring of the action item.

Figure 6:
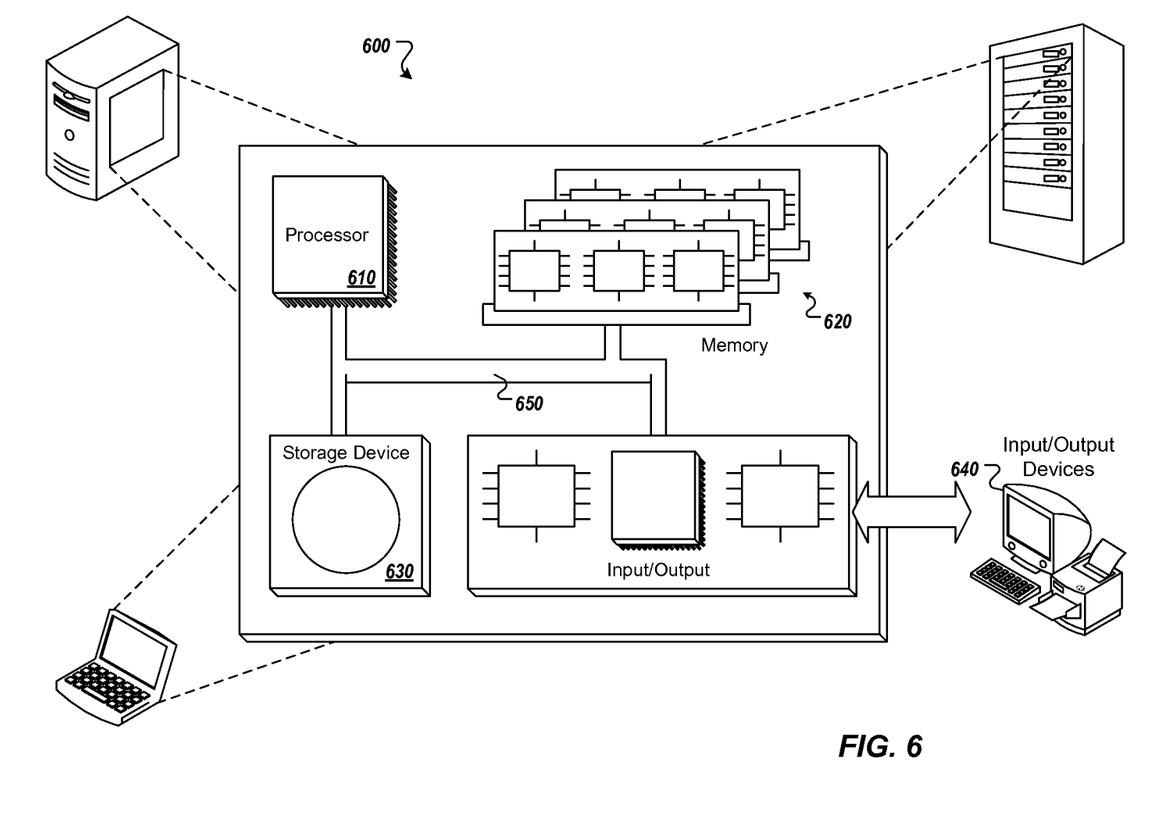
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 800. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing action items from an audio file within an enterprise context, the method being executed using one or more processors and comprising:
    determining, by the one or more processors, a context of the audio file that is to be processed based on a user input indicating a training data selection;
    providing, by the one or more processors, training data to a speech recognition component, the training data being in a format recognizable by the speech recognition component and being provided based on the context;
    receiving, by the one or more processors, a textual transcript corresponding to the audio file from the speech recognition component;
    processing, by the one or more processors, the textual transcript to identify one or more action items by identifying one or more concepts within the textual transcript and matching the one or more concepts to respective transitions in an automaton; and
    providing the one or more action items for display to one or more users.

2. The method of claim 1, wherein the automaton comprises a plurality states and one or more transitions, a transition representing a transition between states.

3. The method of claim 1, wherein processing the textual transcript further comprises, for action items of the one or more action items, determining a respective quality score.

4. The method of claim 3, wherein the quality score is determined based on a precision score and a relevance score.

5. The method of claim 4, wherein the precision score is determined based on an accumulated probability of matched transitions of the automaton and a sum of all probabilities of transitions along accepting paths of the automaton.

6. The method of claim 4, wherein the relevance score is determined based on a degree of matching of a path of the action item with respective paths of one or more previously selected action items.

7. The method of claim 3, wherein the one or more actions items are displayed based on respective quality scores.

8. The method of claim 1, wherein the training data comprises domain-specific information provided from a knowledge base.

9. The method of claim 8, wherein the domain-specific information comprises topic-related information and domain-specific terminology.

10. The method of claim 1, wherein the context is determined based on user input.

11. The method of claim 10, wherein the user input comprises user speech provided in the audio.

12. The method of claim 1, further comprising:
receiving user input, the user input indicating selection of an action item of the one or more action items; and
providing the action item to a management component.

13. The method of claim 12, wherein the management component monitors execution of the action item.

14. The method of claim 1, wherein the audio file is provided as real-time audio.

15. The method of claim 1, wherein the audio file is provided as recorded audio.

16. A non-transitory computer-readable storage medium coupled to one or more processors and having instructions stored thereon which, when executed by the one or more processors, cause the one or more processors to perform operations for providing action items from an audio file within an enterprise context, the operations comprising:
determining, by the one or more processors, a context of the audio file that is to be processed based on a user input indicating a training data selection;
providing, by the one or more processors, training data to a speech recognition component, the training data being in a format recognizable by the speech recognition component and being provided based on the context;
receiving, by the one or more processors, a textual transcript corresponding to the audio file from the speech recognition component;
processing, by the one or more processors, the textual transcript to identify one or more action items by identifying one or more concepts within the textual transcript and matching the one or more concepts to respective transitions in an automaton; and
providing the one or more action items for display to one or more users.

17. A system, comprising:
a computing device; and
a computer-readable storage device coupled to the computing device and having instructions stored thereon which, when executed by the computing device, cause the computing device to perform operations for providing action items from an audio file within an enterprise context, the operations comprising:
determining a context of the audio file that is to be processed based on a user input indicating a training data selection;
providing, training data to a speech recognition component, the training data being in a format recognizable by the speech recognition component and being provided based on the context;
receiving a textual transcript corresponding to the audio file from the speech recognition component;
processing the textual transcript to identify one or more action items by identifying one or more concepts within the textual transcript and matching the one or more concepts to respective transitions in an automaton; and
providing the one or more action items for display to one or more users.

\* \* \* \* \*